March 8, 1955     W. E. BENNINGHOFF     2,703,495
TEMPERATURE CONTROL FOR BILLET HEATING APPARATUS
Filed July 17, 1950     2 Sheets-Sheet 1
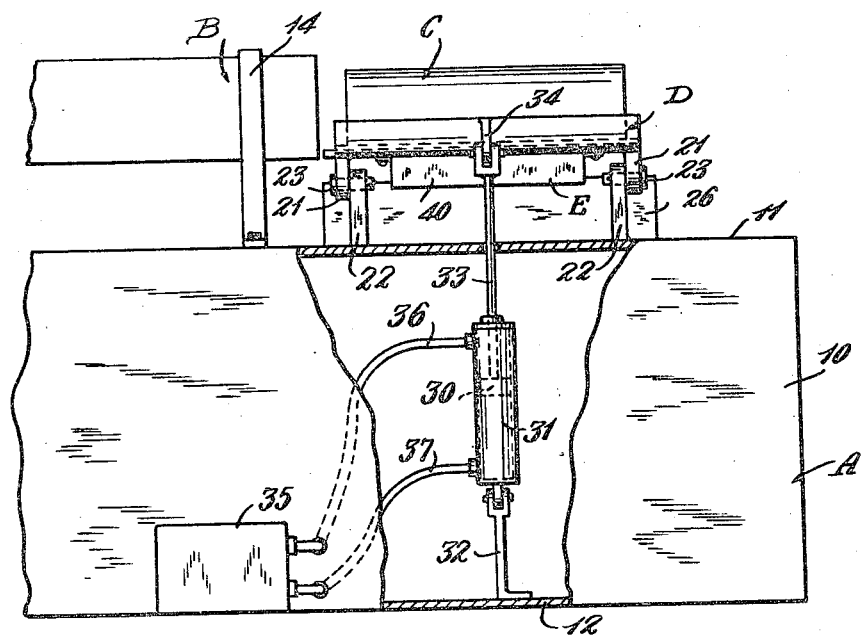
FIG. 1
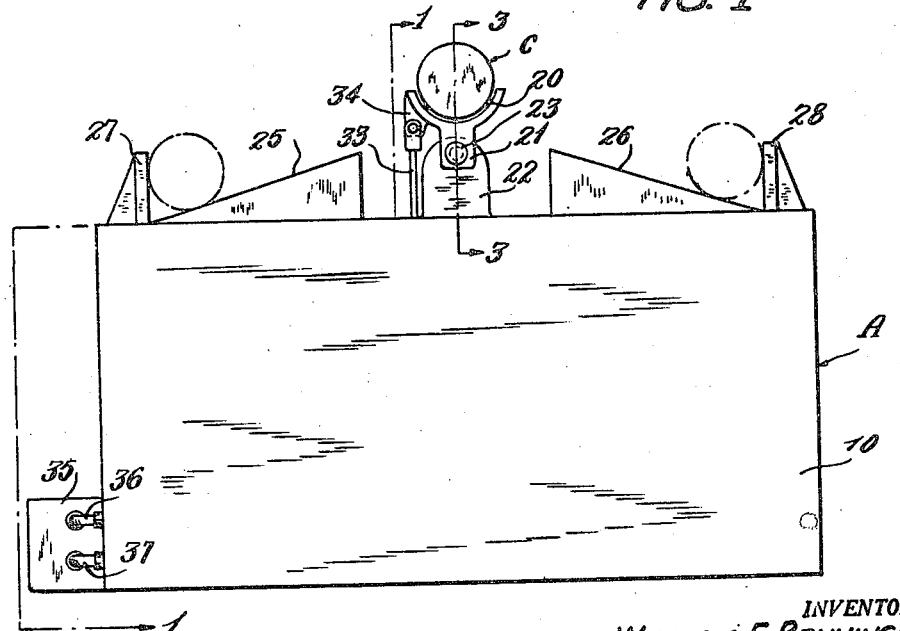
FIG. 2
INVENTOR.
WILLIAM E. BENNINGHOFF
BY
ATTORNEY March 8, 1955     W. E. BENNINGHOFF     2,703,495
TEMPERATURE CONTROL FOR BILLET HEATING APPARATUS
Filed July 17, 1950     2 Sheets-Sheet 2

INVENTOR.
WILLIAM E. BENNINGHOFF
BY
ATTORNEY

United States Patent Office 2,703,495
Patented Mar. 8, 1955

2,703,495

TEMPERATURE CONTROL FOR BILLET HEATING APPARATUS

William E. Benninghoff, Cuyahoga County, Ohio, assignor to The Ohio Crankshaft Company, Cleveland, Ohio, a corporation of Ohio Application July 17, 1950, Serial No. 174,275

1 Claim. (Cl. 73—352)

This invention pertains to the art of billet heating and, more particularly, to apparatus for determining the final temperature of the heated billets.

The invention is particularly applicable to the field of billet heating wherein alternating-current induction heating is employed and the invention will be described with reference to such a type of heating.

Heretofore, in the field of billet heating, induction heating has generally been limited to the heating of steel billets. With such billets, a uniform final temperature can be obtained over a series of billets by holding constant the power input to the induction-heating coil and the heating time for each billet. With steel billets, little difficulty was experienced with power input variations due to minor variations in the dimensions of the steel billet. However, when induction heating is employed for heating of billets formed from a material of a low electrical resistivity, such as aluminum or copper, small variations in the dimensions of the aluminum or copper billet cause rather wide variations in the power input to the coil which, if not compensated for, result in rather wide variations in the final temperature of the billet. The full compensation in the variations in the coil input is oftentimes difficult to control and the operator has difficulty in determining if the full compensation has been accomplished. Therefore, it oftentimes results that a billet is not fully heated or is overheated. When this occurs, the life of the forging dies for the billets is oftentimes radically shortened or defective forgings result.

Other causes for final temperature variations in the heated billet may be variations in the voltage across the coil or variations in the physical and electrical characteristics between various billets.

With billet-heating equipment, it is oftentimes difficult to ascertain the true temperatures of the billet by conventional temperature-recording mechanism. For example, scale on the external surface of the billets gives inaccurate readings on the mechanism.

The present invention contemplates apparatus for use with billet-heating equipment for determining the final temperature of the billet which is unaffected by any scale on the surface of the billet and which acts to reject any underheated or overheated billets.

In accordance with the present invention, a thermosensitive element is moved physically into contact with a heated billet with such force as to pierce any scale which might be on the surfaces to obtain an accurate temperature reading and this apparatus then acts to reject the billet if it is either underheated or overheated and if it is of the proper temperature to advance it for further operations thereon.

The invention may be embodied in a number of different arrangements and combinations of parts, a preferred arrangement of which will be described in this specification and illustrated in the accompanying drawings which form a part hereof, and wherein:

Figure 1 is a fragmentary side elevational view with portions broken away of an alternating-current induction billet heater embodying the present invention;

Figure 2 is an elevational end view of the heater shown in Figure 1;

Figure 3:
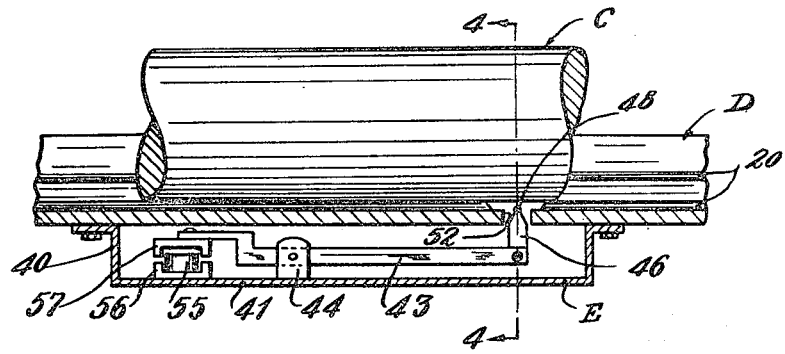
Figure 3 is an enlarged fragmentary cross-sectional view taken approximately on the line 3—3 of Figure 2.
Figure 4:
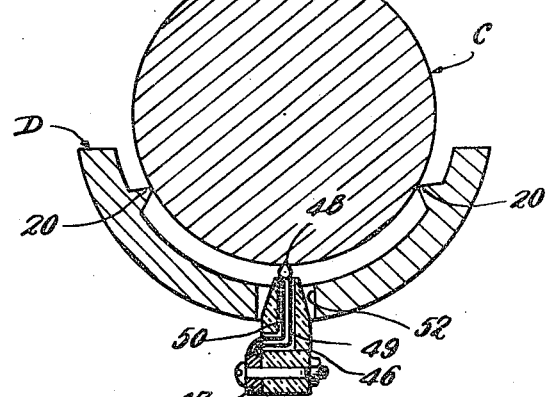
Figure 4 is a still further enlarged fragmentary cross-sectional view taken approximately on the line 4—4 of Figure 3 and showing in detail the thermosensitive apparatus in physical contact with a workpiece.

Referring now to the drawings, Figures 1 and 2 show generally an alternating-current induction-type billet heater comprising generally a base cabinet A, an alternating-current induction-heating coil B in which the billet C is heated by induced electrical currents, and a tray D for receiving the billet C from the coil B after it has been heated. The tray is tiltable to the right as viewed in Figure 2 to reject the billet C or to the left to advance it for forging work. Thermosensitive apparatus E is provided for measuring the temperature of the billet C and for determining in which direction the tray D should be tilted. Billets C are shown in position in tray D and in chutes on either side of the tray D in the rejected or accepted position.

The base cabinet A forms generally a support for the coil B and tray D and also an enclosure for apparatus normally associated with induction-heating equipment. In the embodiment shown, the base A includes side plates 10, a top plate 11 and a base plate 12, all properly fastened together. The heating coil B receives the billets to be heated and is normally energized from a suitable source of alternating current of any suitable frequency. The heating coil B forms no part of the present invention and is shown simply for the purposes of illustrating the invention. For a more detailed description of a heating coil suitable for use in the present invention, reference is made to the patent to Strickland, Jr., No. 2,365,021, patented December 12, 1944. This patent shows a heating coil suitable for use with the present invention and mechanism for advancing heated workpieces into and out of the coil.

The heating coil in the embodiment shown is mounted on the top plate 11 by suitable brackets or the like 14 with t. e axis of the coil horizontal and spaced from the top of the base plate 11. The coil B should have a length and internal diameter at least equal to or greater than the length and diameter respectively of the billet to be heated. The coil may have water-cooled guide rails interiorly thereof so that the workpiece may be slid through the coil without damage to any refractory material which may be positioned therein. The billet C, when the heating period is terminated, is advanced to the right as shown in Figure 2 out of the coil B by push-out mechanism (not shown) onto the tray D.

The tray D is elongated and normally forms an extension to the right of the coil B. Its upper surface is arcuate to form an elongated shallow channel or recess to receive the billets C as they are moved from left to right out of the coil B. The upper surface may also be provided with lugs 20 to support the billet in this recess.

The tray D at each end has depending lugs 21 which pivotally support the tray D on brackets 22 which are fixed to the upper plate 11 of the housing A. In the embodiment shown, a pivot pin 23 extends through the lugs 21 and the brackets 22.

The tray D shown may be tilted to either the right or the left and, when so tilted, the billet C will fall or roll into chutes 25 or 26, depending on which way the tray D is tilted. One of the chutes is for receiving rejected billets because they are either too hot or too cold and the other chute is for the purpose of receiving properly heated billets and holding them until they can be removed for subsequent forging operations. The chutes 25, 26 shown have their bottom adjacent to the tray D raised so that the billet C may readily roll from the tray D onto the chute. Stops 27, 28 are provided at the outer edge of the chutes 25, 26 to retain the billets in the chutes. In Figure 2, one billet is shown in the rejected chute 25 and one billet is shown in the accepted chute 26.

Suitable mechanism is provided for tilting the tray D to either the right or the left as viewed in Figure 2. In the embodiment shown, this mechanism comprises a hydraulic piston-cylinder arrangement 30, 31, the cylinder 31 of which is pivotally mounted on a bracket 32 fixed to the bottom plate 12 of the housing A. The piston 30 has a connecting rod 33 extending upwardly which is pivotally connected to a lug 34 located on the lower side of the tray D and spaced from the pivot axis of the tray D. The cylinder at each end is connected to a suitable source of hydraulic pressure through suitable control valves shown generally at 35 and flexible hoses 36, 37. As shown, the upper plate 11 is slotted to receive the piston rod 33. When pressure is supplied through the hose 36 to the piston-cylinder arrangement 30, 31, the piston is moved downwardly and the tray D is tilted to the left. Conversely, when pressure is applied to the cylinder 31 through the hose 37, the piston is raised and the tray is tilted to the right.

In the embodiment shown, thermosensitive apparatus is provided for the purpose of determining the temperature of the heated billet. This apparatus may be associated with the coil B but is preferably mounted on the tray D.

In the embodiment shown, the thermosensitive apparatus is mounted in a housing 40 which is secured to the underside of the tray D. The housing is generally elongated along the axis of the billet and has a base 41 in spaced parallel relationship to the bottom side of the tray D. An elongated arm 43 is pivotally supported on a trunnion member 44 fixed to the base 41. The right-hand end of the arm 43 has a member 46 extending upwardly therefrom at generally right angles. The member 46 is preferably formed of an insulating material and a thermocouple element 48 is fixed to the upper end thereof. As shown, the member 46 has a hollow interior and wires 49, 50 connect to the thermocouple element 48 extending through this opening. When the arm 43 is pivoted, the thermocouple element 48 moves along a vertical arcuate line through an opening 52 in the tray D into engagement with the lower surface of the billet C. As shown, the upper end of the member 46 is pointed and the thermocouple 48 forms the upper surface of this point so that the thermocouple 48 can penetrate through any scale on the surface of the billet C for obtaining a true temperature reading of the billet. The arm 43 is actuated by a solenoid comprising an energizing coil 55 and a split core including a stationary portion 56 mounted on the base 41 of the housing and a movable armature core 57 which is fixed to the left-hand end of the arm 43. As shown, the pivot axis of the arm 43 is offset to the left so that a small movement of the armature core 57 will produce a sufficient amount of movement of the thermocouple 48 to advance the thermocouple into engagement with the billet C. In Figure 3, the thermocouple is shown in the retracted position; that is, completely recessed below the upper surface of the tray D where it will be protected as new billets C are slid onto the tray D by the coil push-out or feed mechanism. The thermocouple 48 is connected through wires 49, 50 to suitable control apparatus 35, which apparatus, depending upon the temperature of the billet C, will, in turn, actuate valves to operate the hydraulic mechanism 30 and tilt the tray D to either the right or left depending upon the temperature of the billet C on the tray.

In operation, billets C are fed into the left-hand end of the coil D, are heated in the conventional way; and, when the heating is terminated, are further pushed to the right onto the tray D. When the billet C is in position in the tray D, the solenoid 55 is energized to forcefully advance the thermocouple 48 into pressure engagement with the side of the billet C. Depending upon the temperature of the billet, a voltage is generated in the thermocouple which is transmitted to the control apparatus 35 by the wires 49, 50. Depending on whether the billet is too hot, too cold or at the proper temperature, the apparatus actuates the piston-cylinder arrangement 30, 31 to tilt the tray D to either the right or left and, thus, either reject the billet or advance it into the chute 26. It is preferred that, upon actuation of the piston-cylinder arrangement 30, 31, the solenoid 55 will be deenergized so that the thermocouple 48 will drop out of engagement of the billet C and below the upper surface of the tray D where it is protected in the opening 52 when additional billets are advanced under the tray D.

The apparatus shown and described is for the purposes of illustrating the invention only. It will be appreciated that the invention may be embodied in other physical forms differing radically in appearance from that shown in the drawing. As an example, but without limitation, the thermocouple unit may be mounted on the heating coil itself and moved into and out of engagement with the heated billet through spaces between the turns of the heating coil. Additionally, other types of means may be employed to receive the billet and divert it from its normal path to the forging machine in the event the heat-sensitive apparatus indicated that the heating of the billet is improper.

Figure 5:
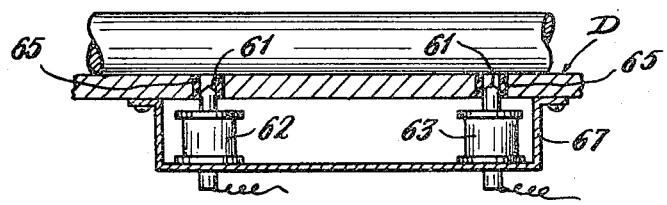
Figure 5 is a view similar to Figure 3 but showing a modified embodiment of the invention.

Other types of heat-sensitive apparatus may be employed for determining whether or not the billet is at the proper and desired temperature. An example of such apparatus is shown in Figure 5. This embodiment makes use of the fact that the resistivity of a billet will vary in a known manner as a direct function of the temperature of the billet. In this embodiment, a pair of electrical contact members 60 and 61 are reciprocally mounted in transverse openings in the surface of the support D. Solenoids 62, 63 are provided for reciprocating the contacts 60 and 61 in the openings toward and away from the billet which is adapted to be positioned in the support or tray D. These contacts preferably slide in insulated bushings 65 mounted on the bottom side of the support D by means of a frame or housing 67.

The contacts 60 and 61 are mounted a fixed and known distance apart on the bottom side of the tray D. When a heated billet is on the tray D, the solenoids 62, 63 are suitably energized, which forcefully drives the contacts 60 and 61 into the lower surface of the billet and through any scale which might be on this surface. These contacts are, in turn, connected to apparatus which is sensitive to variations in the resistivity between the contacts 60 and 61. As the resistivity between these contacts will vary in direct relation to the temperature of the material of the billet, it will be seen that it can be readily determined if the billet is at the proper or desired temperature. The apparatus can then operate to tilt the support D to either reject the billet or advance it to the position where the next succeeding operation may take place.

Having thus described my invention, I claim:

In an apparatus for heating billets or the like to a predetermined temperature, said billet in a heated condition normally having scale on the outer surface thereof, a support for a heated billet, said support having an aperture therein, heat sensitive means carried by said support in registry with said aperture and adapted to extend through said aperture, said heat sensitive means comprising a thermocouple having a sharply pointed end adapted to be driven beneath the surface of a billet, and power means carried by said support for driving said sharply pointed end through said aperture and beneath the surface of a billet.

References Cited in the file of this patent

UNITED STATES PATENTS

| | | |
|---|---|---|
| 939,109 | Switzer | Nov. 2, 1909 |
| 1,951,426 | Littler | Mar. 20, 1934 |
| 1,987,244 | Moore | Jan. 8, 1935 |
| 2,488,037 | Rupley | Nov. 15, 1949 |
| 2,560,737 | Palmer | July 17, 1951 |
| 2,587,686 | Berry | Mar. 4, 1951 |